United States Patent
Kubota et al.

(10) Patent No.: US 6,898,719 B2
(45) Date of Patent: May 24, 2005

(54) MICROCOMPUTER COMPRISING ELECTRIC POWER SOURCE WITHOUT CONDENSER FOR BACKUP FOR CHANGING POWER SOURCE LEVEL BASED ON POWER SUPPLY STOPPED OR RESUMED

(75) Inventors: Susumu Kubota, Gunma (JP); Susumu Yamada, Gunma (JP)

(73) Assignee: Sanyo Electric Co., Ltd., Osaka (JP)

(*) Notice: Subject to any disclaimer, the term of this patent is extended or adjusted under 35 U.S.C. 154(b) by 640 days.

(21) Appl. No.: 10/085,013

(22) Filed: Feb. 28, 2002

(65) Prior Publication Data

US 2002/0129286 A1 Sep. 12, 2002

(30) Foreign Application Priority Data

Mar. 2, 2001 (JP) .................................... P2001-057677

(51) Int. Cl.[7] ................................................ G06F 1/26
(52) U.S. Cl. ...................... 713/320; 713/321; 713/324
(58) Field of Search ................................ 713/300, 320, 713/321, 324

(56) References Cited

U.S. PATENT DOCUMENTS

| | | | | | |
|---|---|---|---|---|---|
| 5,128,863 | A | * | 7/1992 | Nakamura et al. | 463/44 |
| 5,720,560 | A | * | 2/1998 | Nozawa | 400/54 |
| 5,938,770 | A | * | 8/1999 | Kim | 713/300 |
| 6,107,857 | A | * | 8/2000 | Orisaka et al. | 327/333 |
| 6,351,109 | B1 | * | 2/2002 | Yoshida | 323/284 |

* cited by examiner

*Primary Examiner*—Rehana Perveen
(74) *Attorney, Agent, or Firm*—Fish & Richardson P.C.

(57) ABSTRACT

A microcomputer comprises: a first electric power source VDD1 to which a condenser 30 used for backup is added; a second electric power source VDD2 to which the condenser 30 used for backup is not added; and a resistance load 40 added to the second electric power source. When a supply of voltage of the second electric power source VDD2 is stopped, a level of the second electric power source VDD2 is changed from a high level to a low level, and when the supply of voltage of the second electric power source VDD2 is resumed, the level of the second electric power source VDD2 is returned from the low level to the high level.

10 Claims, 5 Drawing Sheets

MICROCOMPUTER COMPRISING ELECTRIC POWER SOURCE WITHOUT CONDENSER FOR BACKUP FOR CHANGING POWER SOURCE LEVEL BASED ON POWER SUPPLY STOPPED OR RESUMED

BACKGROUND OF THE INVENTION

1. Field of the Invention

The present invention relates to a microcomputer. More particularly, the present invention relates to a microcomputer capable of appropriately setting a state such as a state of reset-start according to a state of the electric power source.

2. Description of the Related Art

Microcomputers are widely used for controlling various types of electronic equipment. In general, electric power is supplied to the microcomputer 100 from the electric power circuit 10 provided in the electric equipment as shown in FIG. 6. When the electric power circuit 10 is turned off, the detection circuit 101 housed in the microcomputer 100 detects the occurrence of an abnormal condition of a level of electric power source voltage VDDIN. By the result of detection, the microcomputer 100 conducts the setting of self-status, or the microcomputer 100 conducts the reset-start when the supply of voltage from the electric power source circuit 10 is returned.

In this connection, in the microcomputer 100, the condenser 30 used for backup is attached to its electric power source. The reason why the condenser 30 used for backup is attached to the electric power source is described as follows. When the electric power source circuit 10 is turned off, the level of electric power source voltage VDD is temporarily maintained by the condenser 30 used for backup, so that data stored in RAM and the register housed in the microcomputer 100 can be maintained.

For the above reasons, although the detecting circuit 101 for detecting the level of electric power source VDD is provided, a change in the level of electric power source VDD, which is caused when the electric power source 10 is turned on and off, is small. Therefore, it is difficult to appropriately reset the state of the microcomputer 100 according to the state of the electric power source.

SUMMARY OF THE INVENTION

It is an object of the present invention to provide a microcomputer capable of appropriately setting its state according to the state of the electric power source. It is another object of the present invention to provide a microcomputer capable of conducting a reset start motion with high accuracy after it has returned from the state of backup.

A microcomputer of the present invention comprises: a first electric power source to which a condenser used for backup is added; a second electric power source to which the condenser used for backup is not added; and a resistance load added to the second electric power source, wherein when a supply of voltage of the second electric power source is stopped, a level of the second electric power source is changed from a first state to a second state, and when the supply of voltage of the second electric power source is resumed, the level of the second electric power source is returned from the second state to the first state.

The present invention is applied to a microcomputer having a first electric power source to which a condenser used for backup is added and also having a second electric power source to which the condenser used for backup is not added. Electric power of the first electric power source is supplied to circuit blocks such as a CPU, RAM and register which need backup by a condenser. Electric power of the second electric power source is supplied to circuits, which do not need backup conducted by a condenser, for example, electric power of the second electric power source is supplied to an input and an output circuit.

Since a resistance load is added to the second electric power source, when a supply of voltage from the second electric power source is stopped, a level of the second electric power source is changed from the first state (high level) to the second state (low level). Next, when the supply of voltage from the second electric power source is resumed, the level of the second electric power source is changed from the second state (low level) to the first state (high level).

Therefore, a change in the level of the second electric power source can be clearly distinguished between the stoppage and the resuming of electric power supply. When this change in the level of the second electric power source is detected, it is possible to appropriately set the state of the microcomputer, for example, advancing to the standby mode or reset-starting in the case of resuming the supply of electric power can be appropriately conducted.

A microcomputer of the present invention further comprises a reset signal generating circuit for outputting a reset signal according to the change in the level of the second electric power source, wherein when the level of the second electric power source is returned from the second state to the first state, the reset signal generating circuit outputs a reset signal.

When an electric power supply from the electric power source is resumed from the state of stoppage of the electric power supply, a change (change from a high level to a low level) in the level of the second electric power source can be made clear as described above. Therefore, a reset signal can be more reliably outputted from the reset signal generating circuit. A microcomputer is reset-started by using this reset signal.

DESCRIPTION OF THE PREFERRED EMBODIMENTS

Figure 1:
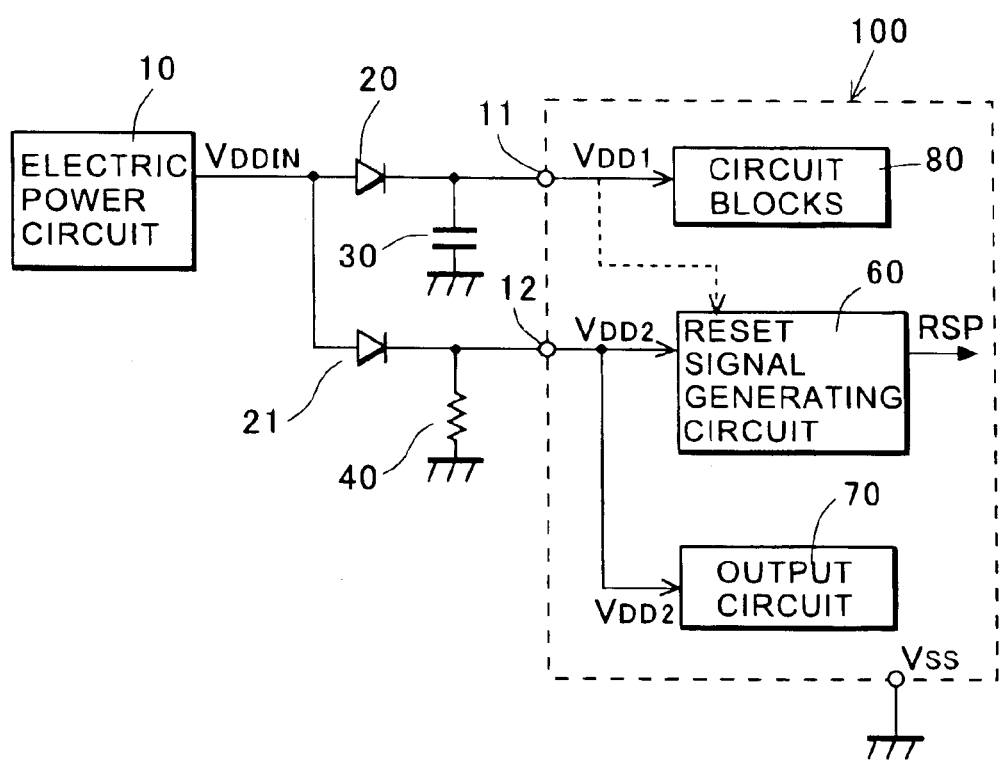
FIG. 1 is a circuit diagram showing an arrangement of a microcomputer of an embodiment of the present invention.

Next, referring to the drawings, a microcomputer of the embodiment of present invention will be explained below. FIG. 1 is an arrangement view of the microcomputer. Electric power source voltage VDDIN is supplied to the first electric power source terminal 11 and the second electric power source terminal 12, which are arranged in the microcomputer 100, from the electric power source circuit 10 provided in the electronic equipment. An electric power source line, which is wired inside from the first electric power source terminal 11, composes the first electric power source VDD1. An electric power source line, which is wired inside from the second electric power source terminal 12, composes the second electric power source VDD2.

Since the condenser 30 used for backup is connected with the electric power source terminal 11, the condenser 30 used for backup is added to the first electric power source VDD1. Electric power is supplied from this first electric power source VDD1 to circuit blocks 80 such as a CPU, RAM and various registers housed in the microcomputer 100. Due to the foregoing, even when a supply of electric power source voltage VDDI from the electric power circuit 10 is stopped, data in the above circuit blocks 80 can be held in the standby mode.

The condenser 30 used for backup is not added to the second electric power source VDD2. Instead of that, the resistance load 40 is connected between the electric power source terminal 12 and the ground. Due to the foregoing, the resistance load 40 is added to the second electric power source VDD2. Electric power is supplied from this second electric power source VDD2 to the output circuit 70 arranged inside the microcomputer 100. Electric power is supplied from this second electric power source VDD2 to the reset signal generating circuit 60 for outputting a reset signal RSP when a change in the level is detected.

As described above, the microcomputer 100 of this embodiment is provided with two systems of electric power sources VDD1 and VDD2. When the electric power source system is divided into two as described above, it is possible to prevent the noise, which is generated when the output circuit 70 is switched, from affecting another system of electric power source (the first electric power source VDD1 in this embodiment).

The diodes 20, 21 are respectively arranged in the voltage supply paths from the electric power circuit 10 to the first electric power source VDD1 and the second electric power source VDD2. These diodes 20, 21 prevent the occurrence of mutual interference caused between the first electric power source VDD1 and the second electric power source VDD2 by noise.

In the present invention, on the assumption that the above two systems of electric power sources VDD1 and VDD2 are provided, when the resistance load 40 is added to the second electric power source VDD to which the condenser 30 used for backup is not added, a change in the level of the second electric power source VDD can be made clear. In this connection, the resistance load 40 may be arranged in such a manner that the resistor member is externally attached to the microcomputer 100. Alternatively, the resistance load 40 maybe housed in the chip of the microcomputer 100.

Figure 2:
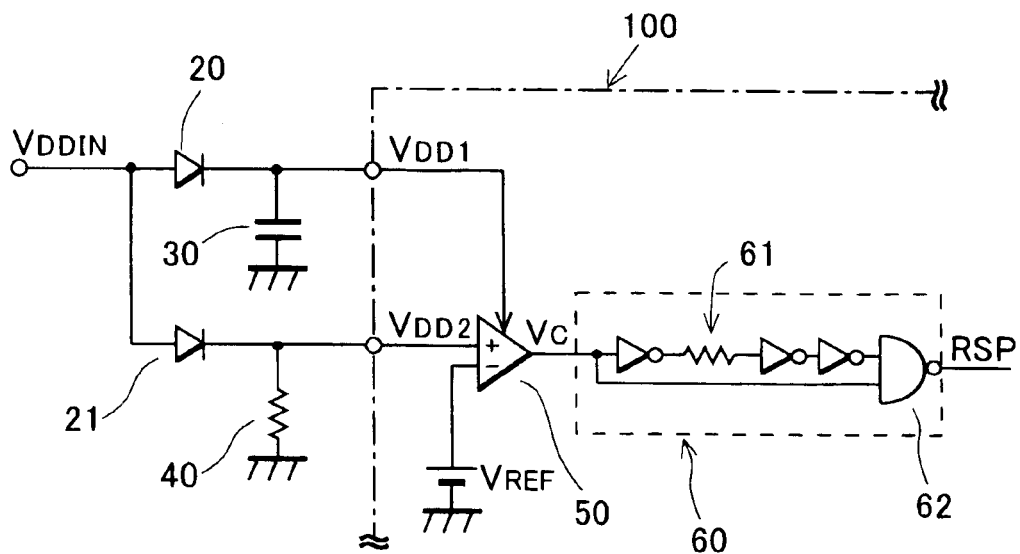
FIG. 2 is a circuit arrangement view showing a reset signal generating circuit provided in a microcomputer of an embodiment of the present invention.

Next, FIG. 2 shows a specific example of the reset signal generating circuit 60. At the front stage of the reset signal generating circuit 60, there is provided a comparator circuit 50. Electric power is supplied from the second electric power source VDD2 to the non-inverted input terminal (+) of the comparator circuit 50. Reference voltage VREF is supplied to the inverted input terminal (−). Reference voltage VREF is set at an intermediate level between the ground level (Vss) and the high level VDDH of the second electric power source VDD2 (Vss<VREF<VDDH).

The comparator circuit 50 can be easily composed, for example, when the CMOS calculation amplifying circuit is used. When the first electric power source VDD1 is used for the electric power source of the comparator circuit 50, even if an electric power supply from the electric power circuit 10 is stopped, the comparator circuit 50 can be stably operated.

The comparator circuit 50 compares the level of the second electric power source VDD2 with the level of reference voltage VREF. In the case of VDD2>VREF, the comparator circuit 50 outputs a high level. In the case of VDD2<VREF, the comparator circuit 50 outputs a low level.

The reset signal generating circuit 60 is composed in such a manner that an output of the comparator circuit 50 is given to one input terminal of the NAND circuit 62, and that an output of the delay circuit 61 is given to the other input terminal of the NAND circuit 62.

Figure 3:
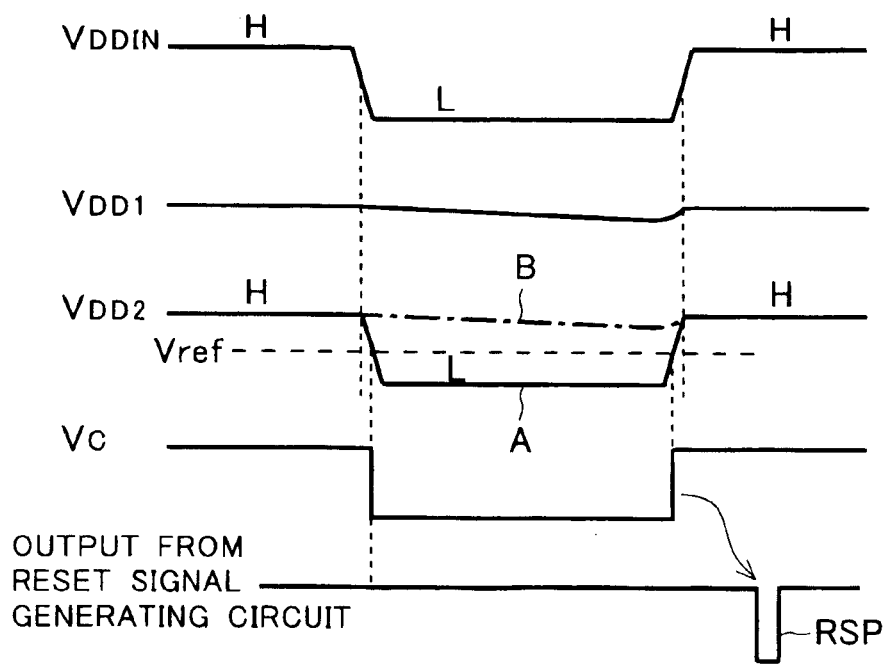
FIG. 3 is a motion timing diagram of a microcomputer of an embodiment of the present invention.

Next, an example of operation of the microcomputer composed as described above will be explained referring to the operation timing chart shown in FIG. 3. When a supply of voltage from the electric power source circuit 10 is stopped, electric power source voltage VDDIN is decreased from a high level (for example, 5 V) to a low level (for example, 0 V). When a supply of voltage from the electric power source circuit 10 is resumed, electric power source voltage VDDIN is returned from the low level to the high level. Since the condenser 30 used for backup is added to the first electric power source VDD1, although an electric current is somewhat consumed for the backup operation of the microcomputer 100, a change in the level caused by the change of electric power source voltage VDDIN is small.

On the other hand, the condenser 30 used for backup is not added to the second electric power source VDD2. Instead of that, the resistance load 40 is added to the second electric power source VDD2. Therefore, when electric power source voltage VDDIN falls, a level of the second electric power source VDD2 is changed to a low level. After that, in accordance with electric power source voltage VDDIN, a level of the second electric power source VDD2 is returned to the high level (as shown by reference mark A in the drawing). If the resistance load 40 is not added, the change in the level is very small (as shown by reference mark B in the drawing).

According to the comparison with reference voltage VREF, the comparator circuit 50 detects a change in the level of the second electric power source VDD2 and outputs an output signal Vc. Then, the reset signal generating circuit 60 detects a rise of the output signal Vc and outputs a reset pulse signal RSP.

Figure 4:
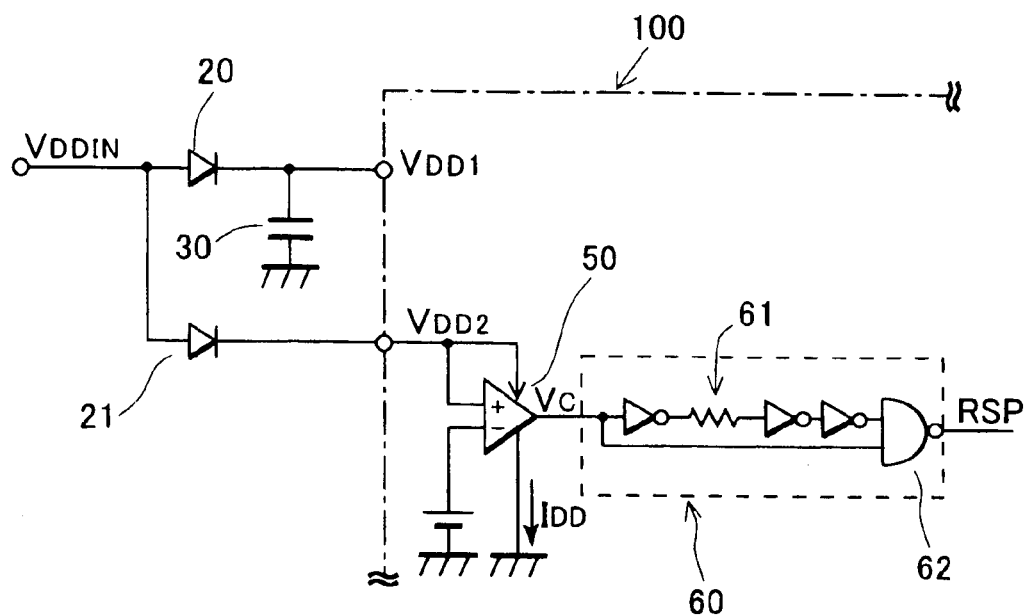
FIG. 4 is another circuit arrangement view showing a reset signal generating circuit provided in a microcomputer of an embodiment of the present invention.

FIG. 4 shows another example of the arrangement of the reset signal generating circuit 60. This example of the arrangement is different from the example of the arrangement shown in FIG. 2 as follows. In this arrangement of the reset signal generating circuit 60, not the first electric power source VDD1 but the second electric power source VDD2 is used. According to this arrangement, the comparator circuit 50 can be used both as the comparator circuit 50 and the resistance load 40. That is, since an electric power source current IDD flows in the comparator circuit 50, the comparator circuit 50 can be assumed to be the load resistance 40. Due to the foregoing, the number of resistor parts externally arranged outside of the microcomputer 100 can be reduced.

Figure 5:
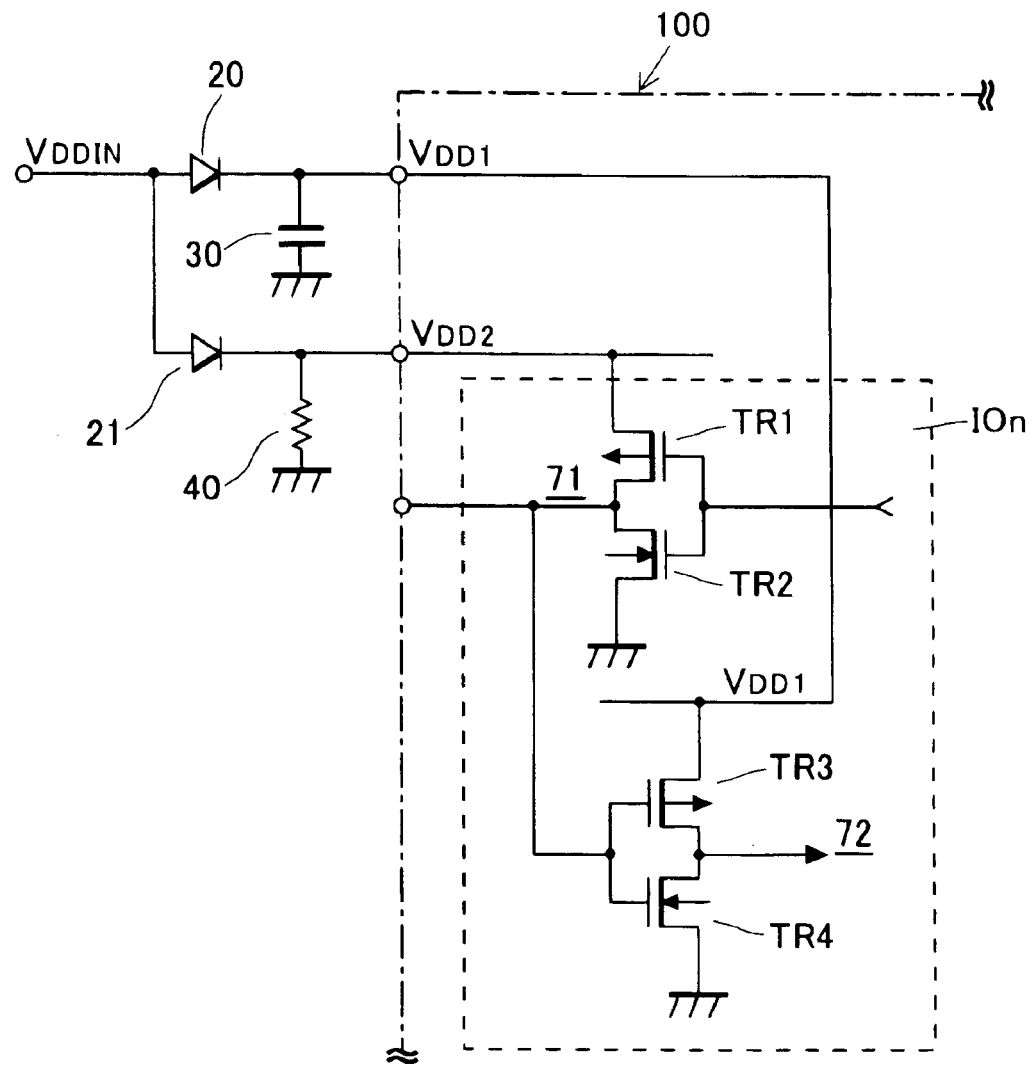
FIG. 5 is a circuit arrangement view showing an input and output circuit 10*n* housed in a microcomputer 100 of an embodiment of the present invention.
Figure 6:
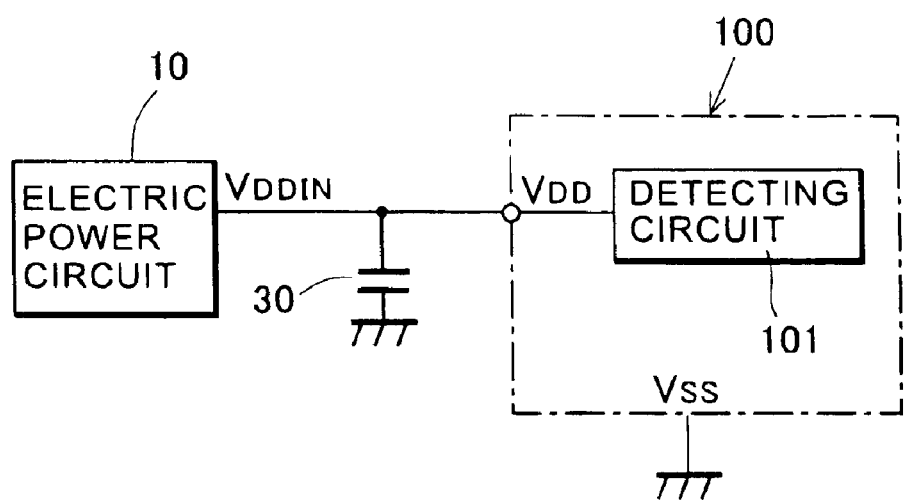
FIG. 6 is a circuit diagram showing an arrangement of a microcomputer of a conventional example.

FIG. 5 shows an example of the input and output circuit I0*n* of the microcomputer 100. Although a large number of input and output circuits are arranged in the microcomputer 100, only one of input and output circuits is shown in this drawing so as to simplify the explanation.

The input and output circuit I0*n* is composed of an output buffer 71 and an input buffer 72. The output buffer 71 is a CMOS inverter and composed of a P-channel type MOS transistor TR1 and an N-channel type MOS transistor TR2. The input buffer 72 is also a CMOS inverter and composed of a P-channel type MOS transistor TR3 and an N-channel type MOS transistor TR4.

The transistor size of the output buffer 71 is larger than that of the input buffer 72. Due to the foregoing, the drive capacity of the output buffer 71 is set large. Concerning the electric power source of the output buffer 71, the second electric power source VDD2 is used. On the other hand, concerning the electric power source of the input buffer 72, the first electric power source VDD1 is used. Due to the foregoing, it can be prevented that the noise caused by the switching operation of the output buffer 71 affects the operation of other circuits.

In the above embodiment, the microcomputer 100 is provided with two electric power sources. However, the present invention is not limited to the above specific embodiment. It is possible to apply the present invention to a microcomputer having not less than two electric power sources. In this case, the condenser 30 used for backup is added to at least one electric power source. And the condenser 30 used for backup is not added to at least one of the other electric power sources, but, instead of that, the resistance load 40 is added to one of the other electric power sources.

According to the present invention, the resistance load is added to the second electric power source to which the condenser used for backup is not added. Therefore, a change in the level caused by the stopping and resuming of the electric power source can be made clear. When this change in the level is detected, the state setting of the microcomputer can be appropriately conducted.

According to the present invention, the reset signal is made according to the change in the level of the second electric power source. Therefore, the reset starting operation after returning from the state of backup by the condenser can be conducted with high accuracy.

What is claimed is:

1. A microcomputer comprising: a first electric power source to which a condenser used for backup is added; a second electric power source to which a condenser used for backup is not added; and a resistance load added to the second electric power source, wherein when a supply of power voltage of the second electric power source is stopped, a level of the second electric power source is changed from a first state to a second state, and when the supply of power voltage of the second electric power source is resumed, the level of the second electric power source is returned from the second state to the first state.

2. A microcomputer according to claim 1, further comprising a reset signal generating circuit for outputting a reset signal according to the change in the level of the second electric power source, wherein when the level of the second electric power source is returned from the second state to the first state, the reset signal generating circuit outputs a reset signal.

3. A microcomputer according to claim 2, further comprising a comparator circuit for comparing the level of the second electric power source with a predetermined reference voltage, wherein the reset signal generating circuit outputs a reset signal according to an output of the comparator circuit.

4. A microcomputer according to claim 3, wherein the load resistance is externally attached to the microcomputer.

5. A microcomputer according to claim 4, wherein a power voltage is supplied to the comparator circuit from the first electric power source.

6. A microcomputer according to claim 3, wherein the load resistance is housed in the microcomputer.

7. A microcomputer according to claim 6, wherein the comparator circuit is used both as a comparator and a load resistance by supplying a power voltage to the comparator circuit from the second electric power source.

8. A microcomputer comprising:

a first electric power source to which a condenser used for backup is added; a second electric power source to which a condenser used for backup is not added; an output buffer circuit to which power is supplied from the second electric power source; circuit blocks except for the output buffer circuit, the circuit blocks being supplied with power from the first electric power source; and a resistance load added to the second electric power source, wherein power voltage of the first and the second electric power source is supplied from an external electric power source circuit, when a supply of power voltage from the electric power source circuit is stopped, a level of the second electric power source is changed from a first state to a second state by the load resistance, and when the supply of power voltage from the electric power source circuit is resumed, the level of the second electric power source is returned from the second state to the first state.

9. A microcomputer according to claim 8, further comprising a reset signal generating circuit for outputting a reset signal according to the change in the level of the second electric power source, wherein when the level of the second electric power source is returned from the second state to the first state, the reset signal generating circuit outputs a reset signal.

10. A microcomputer according to claim 9, further comprising a comparator circuit for comparing the level of the second electric power source with a predetermined reference voltage, wherein the reset signal generating circuit outputs a reset signal according to an output of the comparator circuit.

* * * * *